March 22, 1955   G. W. SCHNETZER, JR., ET AL   2,704,641
REEL FOR STRIP MATERIAL
Filed Aug. 25, 1951
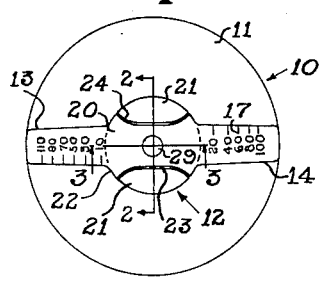
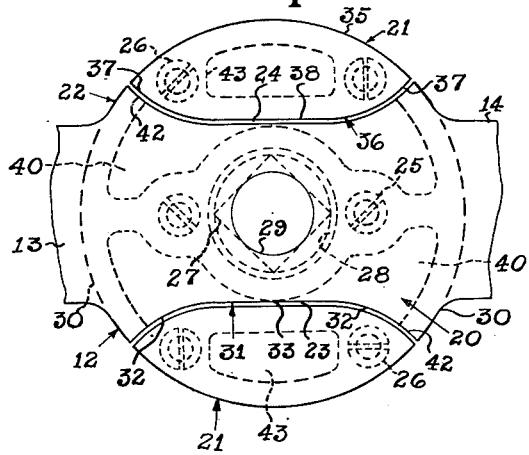
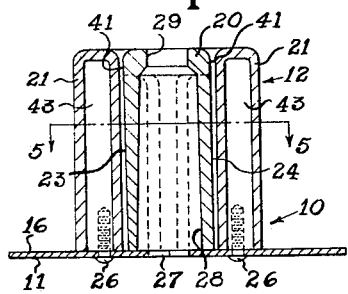
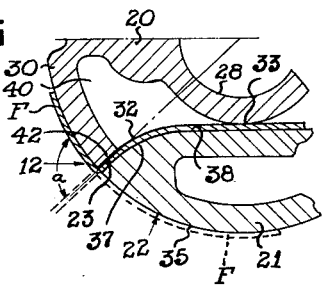
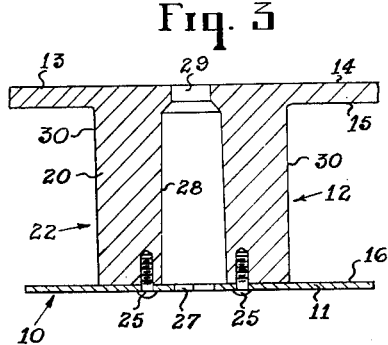
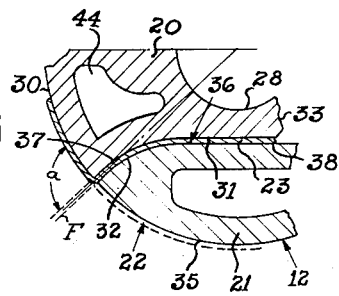
GEORGE W. SCHNETZER, JR.
NORMAN H UNTERBORN
*INVENTORS*
BY Daniel J. Mayne
Lloyd F. Seebach
ATTY. & AGT.

United States Patent Office 2,704,641
Patented Mar. 22, 1955

2,704,641

REEL FOR STRIP MATERIAL

George W. Schnetzer, Jr., and Norman H. Unterborn, Rochester, N. Y., assignors to Eastman Kodak Company, Rochester, N. Y., a corporation of New Jersey Application August 25, 1951, Serial No. 243,682

1 Claim. (Cl. 242—74)

This invention relates to reels for winding a strip material thereon, and more particularly to a reel of the type for winding a film strip thereon and having a hub provided with a novel arrangement of slots for easily securing the end of said film strip thereto.

Reels which are used for winding a film strip on the hub thereof usually comprise a pair of flanges which are spaced the required distance apart by a hollow cylindrical hub, the hub being provided with an axial slot, or other means on said hub or flanges, for securing the end of the film strip thereto. Various means have been devised to facilitate insertion of the end of the film strip into the slot, or attachment of said end. However, any of these various attaching means, even in instances where suitable finger apertures are provided in the flanges, are so arranged that it is necessary for the operator to use both hands to satisfactorily secure the end of the film strip.

In the present invention, the reel has been designed so that the end of the film strip can be secured to the hub with one hand and without having to reach through one or both flanges. This has been accomplished by providing only one full flange and a pair of opposed arms spaced from said flange for engaging the outer surfaces of the film convolutions and by providing a pair of opposed slots extending axially of the hub and arranged between said arms. The slots are generally continuous curves and intersect the periphery of the hub normal to a tangent at the points of intersection. The film, therefore, emerges from the loading slot in line with the center of the hub so that the same folding or wrap-around angle is provided for the film regardless of the direction of rotation of the reel. The narrow slot together with its curved contour insures reliable gripping of the end of the film strip so that the film will not pull out of the slot when the reel is rotated. On the other hand, the slots permit the film strip to readily detach itself from the slot when the direction of rotation of the reel is reversed.

The primary object of the invention, therefore, is to provide a film reel in which the hub is provided with a continuous generally curved slot for receiving the end of the film strip and which is arranged so that said film strip emerges therefrom in line with the center of the hub or core.

Another object of the invention is to provide a film reel in which the hub is provided with a pair of continuous generally curved slots which intersect the hub normal to a tangent at the points of intersection to provide equal angles of wrap-around for the film strip, regardless of the direction of rotation of the reel.

Still another object of the invention is to provide a film reel with a hub comprising a plurality of formed members which, when arranged on a flange member, provide a cylindrical hub on which a film strip is wound and a pair of opposed and continuous generally curved slots for receiving the end of the film strip.

Yet another object of the invention is to provide a film reel with a hub having a pair of opposed and continuous generally curved slots which extend axially of the hub to a flange member and which permit the film strip to be inserted therein upon movement thereof toward said flange member, the contour of said slots insuring reliable gripping of the film during wind-up and permitting the film strip to readily detach itself from the slot during wind-off.

And still another object of the invention is to provide a film reel which is reliable in its function and which is relatively inexpensive to manufacture and is easily assembled.

These and other objects and advantages will be apparent to those skilled in the art by the description which follows.

Reference is now made to the accompanying drawing wherein like reference numerals designate like parts and wherein:

Fig. 1 is a plan view of a film reel embodying the invention and showing the relation of the continuous generally curved slots;

Fig. 2 is an enlarged sectional view, taken substantially on line 2—2 of Fig. 1, and showing the structure of the members comprising the reel hub;

Fig. 3 is an enlarged sectional view, taken substantially on line 3—3 of Fig. 1;

Fig. 4 is an enlarged plan view and showing particularly the structure of the hub;

Fig. 5 is a horizontal sectional view, taken substantially on line 5—5 of Fig. 2, and showing the film engaging surfaces of the hub members; and Fig. 6 is a horizontal sectional view similar to Fig. 5 and showing a hub structure in which the central member of the hub provides a continuous vertical concave surface for engaging the film strip.

The reel 10 comprises a flange member 11, a hub, generally designated by the numeral 12, and a pair of diametrically opposed arms 13 and 14, the inner surfaces 15 of which are spaced from surface 16 of flange member 11 by a distance slightly greater than the width of the strip material, or film strip F, see Fig. 3. The arms 13 and 14 have a scale 17 engraved thereon, as shown in Fig. 1, said scale being arranged on both arms, as shown, or only on one of said arms.

In the preferred embodiment of the invention, the hub 12 comprises a central member 20 and members 21, said members being formed as hereinafter described to provide a substantially continuous cylindrical surface 22 on which the film strip is wound and a pair of opposed slots 23 and 24. The members 20 and 21 are secured to flange member 11 by screws 25 and 26, respectively. Flange member 11 is provided with a square aperture 27 and member 20 is provided with a recess 28 and a round aperture 29, said apertures being adapted to receive the driving spindle on which the reel is mounted, as is well-known in the art. The member 20 has arms 13 and 14 formed integral therewith and comprises two partial cylindrical surfaces 30 which are diametrically opposite each other and two substantially concave surfaces 31 which are also diametrically opposite each other, see Figs. 4 and 5. The surfaces 30 are under arms 13 and 14 and are intersected by surfaces 31. Concave surfaces 31 comprise curved portions 32 at the outer extremities thereof and an intermediate plane surface 33. Members 21 comprise partial cylindrical surfaces 35 which are intersected by the convex surfaces 36 comprising curved portions 37 and an intermediate plane surfaces 38. As shown in Fig. 4, when members 20 and 21 are properly assembled on flange 11, the surfaces 31 and 36 form the slots 23 and 24 which are arranged on opposite sides of aperture 29, the central portions of the slots being substantially parallel, and the surfaces 30 and 35 form the cylindrical surface 22 of hub 12. From Fig. 2, it will be noted that slots 23 and 24 extend axially of hub 12 to the surface 16 of flange member 11. Surfaces 30 and 35, therefore, provide a cylindrical hub on which the strip material is wound, and slots 23 and 24 provide a means for securing the end of the film strip to the hub.

The curved portions 32 and 37 with the plane surfaces 33 and 38 form continuous generally curved slots which intersect the cylindrical hub normal to a tangent at the point of intersection or, in other words, said slots are designed so that the film emerges from the slot along a radius of the hub, as shown in Figs. 5 and 6. Since the film strip emerges along such a line, the folding or wrap-around angle $a$ is the same regardless of the direction of rotation of the reel. The slots 23 and 24, therefore, may follow any curvature or contour so long as the film emerges therefrom along a radius of the hub. The curve of slots 23 and 24, as shown in Figs. 4–6, is sufficient to cause the film strip to wrap around hub 12 without pulling out of the slot when the take-up reel is rotated. On the other hand, the curves permit the film strip to readily detach itself from the slot when the direction of winding is reversed. To attach the end of the film strip to the hub, the film strip is merely inserted in either slot and moved downwardly toward flange member 11. As the reel is rotated, the protruding end will be folded over and held against the hub by the first convolution of the film strip.

In the preferred embodiment of the invention as shown in Figs. 2, 4 and 5, the surface 31 is relieved as indicated at 40 so that surface 31 is continuous with surface 36 along the top thereof, as indicated at 41 in Fig. 2 and at the ends of the slots, as indicated at 42 in Fig. 4. However, as shown in Fig. 6, the surface 31 may be continuous with surface 36 by providing recesses 44 in hub 12 similar to the recesses 43 in members 21.

While the reel has been disclosed for mounting on a spindle, as is well-known in the photographic art, said reel may be mounted in other ways for a particular application. Accordingly, the apertures 27 and 29 may be replaced by some other means for coupling the reel to a drive source. The arms 13 and 14 may also be eliminated in applications where the reel is used in a horizontal position. As to structure, flange 11 and members 21 may be combined into a single member with the member 20 secured in position as described above and forming slots 23 and 24. In instances where the arms 13 and 14 have been eliminated, the hub 12 may be formed as described hereinbefore or may be integral with flange 11 in which case a single slot, or two slots to allow a choice when inserting the film strip, may be formed in said hub by a milling or broaching operation.

Since other variations of the invention will readily occur to those skilled in the art the scope of the invention is not to be limited in any respect by the present disclosure but is defined in the appended claim.

Having now particularly described our invention, what we desire to secure by Letters Patent of the United States and what we claim is:

A reel comprising a flange member provided with a central aperture for receiving a drive spindle, and a hub adapted to have a strip material wound thereon, said hub comprising a member provided with an aperture for receiving said spindle and having opposed cylindrical surfaces and opposed substantially concave surfaces, each of said concave surfaces comprising curved surfaces intersecting said cylindrical surfaces and a plane surface intermediate said curved surfaces, a pair of radially extending arms integral with said member at one end thereof and arranged centrally of said cylindrical surfaces for engaging the outer edge of said strip material on said hub, and members having a cylindrical surface and a substantially convex surface, said convex surface comprising curved surfaces intersecting said cylindrical surface and a plane surface intermediate said curved surfaces, said member and members being secured to said flange member with said convex and concave surfaces in spaced relation whereby said cylindrical surfaces form a substantially continuous cylindrical surface on which said strip material is wound and said convex and concave surfaces form a pair of slots arranged on opposite sides of said aperture and extending axially of said hub to said flange member for receiving the end of said strip material, said slots being of the same width throughout the entire length thereof, the ends of said slots intersecting the periphery of said hub normal to a tangent at the points of intersection and said points of intersection being less than 180° apart to provide equal angles of wrap-around for said strip material irrespective of the direction of rotation of the reel.

References Cited in the file of this patent

UNITED STATES PATENTS

| | | |
|---|---|---|
| 2,476,928 | Thomas | July 19, 1949 |
| 2,574,883 | Medal | Nov. 13, 1951 |

FOREIGN PATENTS

| | | |
|---|---|---|
| 431,250 | Great Britain | July 3, 1935 |
| 673,012 | Germany | Mar. 14, 1939 |
| 688,033 | Germany | Feb. 10, 1940 |